Figure 1:
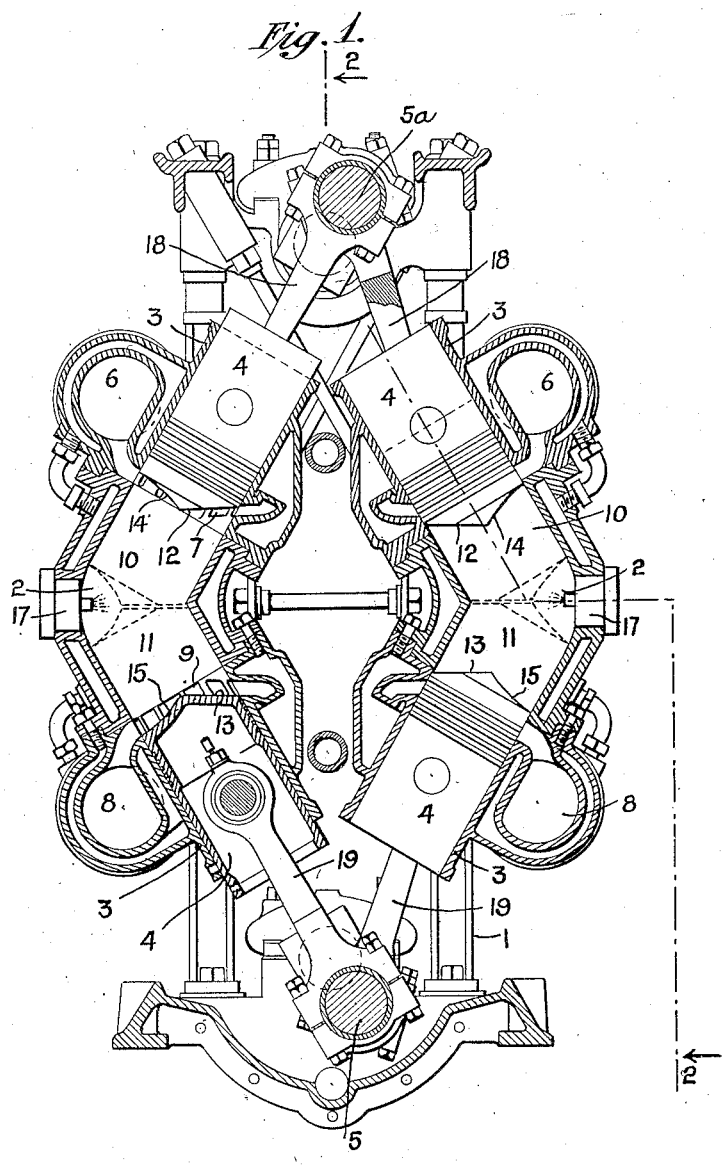

L. WYGODSKY.
COMBINED AIR PUMP AND STARTER MOTOR MECHANISM FOR INTERNAL COMBUSTION ENGINES.
APPLICATION FILED NOV. 23, 1918.

1,406,319.

Patented Feb. 14, 1922.

6 SHEETS—SHEET 1.

INVENTOR
Leon Wygodsky
BY
William W. Varney
ATTORNEY

WITNESS:

L. WYGODSKY.
COMBINED AIR PUMP AND STARTER MOTOR MECHANISM FOR INTERNAL COMBUSTION ENGINES.
APPLICATION FILED NOV. 23, 1918.

1,406,319.

Patented Feb. 14, 1922.
6 SHEETS—SHEET 4.

WITNESS:

INVENTOR
Leon Wygodsky
BY
William W. Varner
ATTORNEY

L. WYGODSKY.
COMBINED AIR PUMP AND STARTER MOTOR MECHANISM FOR INTERNAL COMBUSTION ENGINES.
APPLICATION FILED NOV. 23, 1918.
1,406,319.
Patented Feb. 14, 1922.
6 SHEETS—SHEET 5.
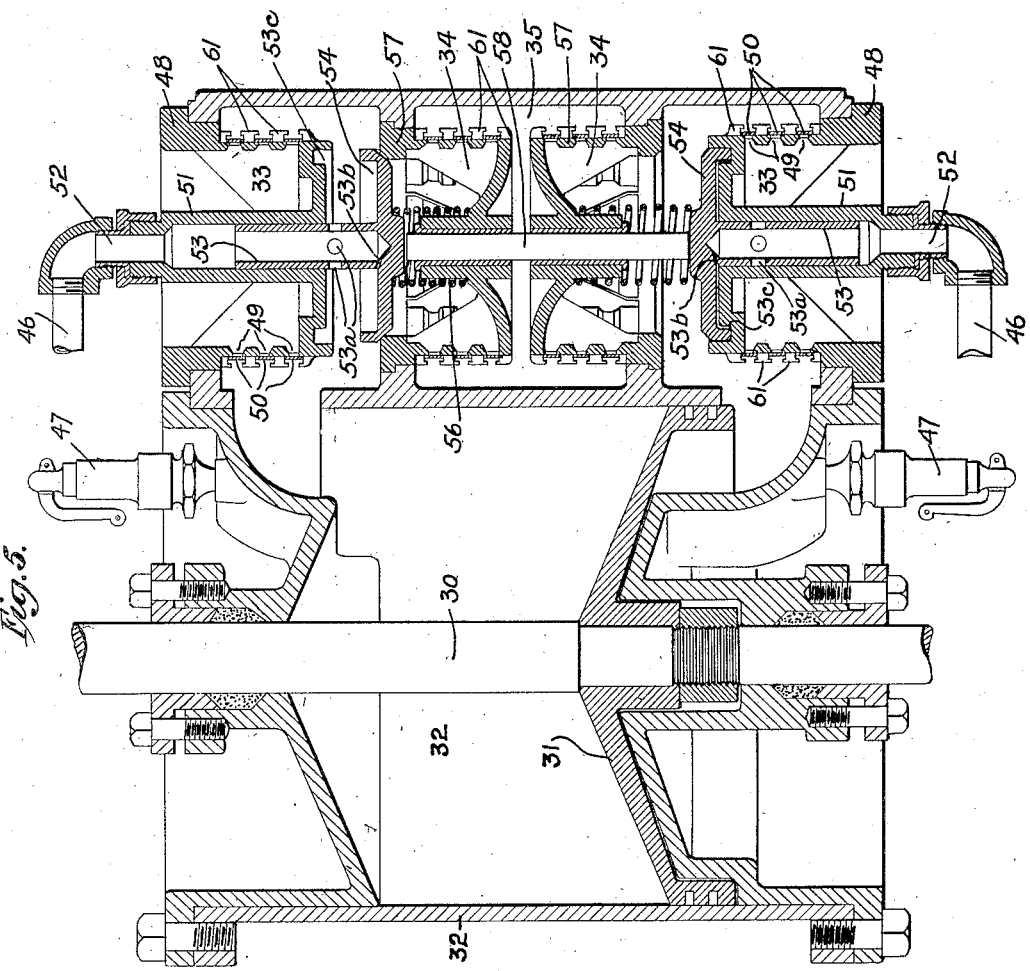
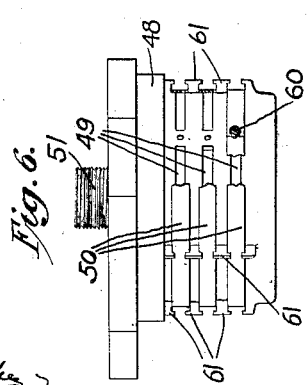
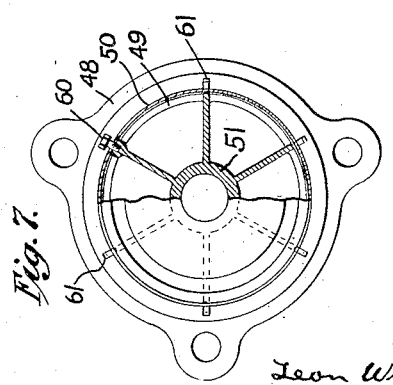
INVENTOR
Leon Wygodsky
BY
William W. Verney
ATTORNEY
WITNESS:

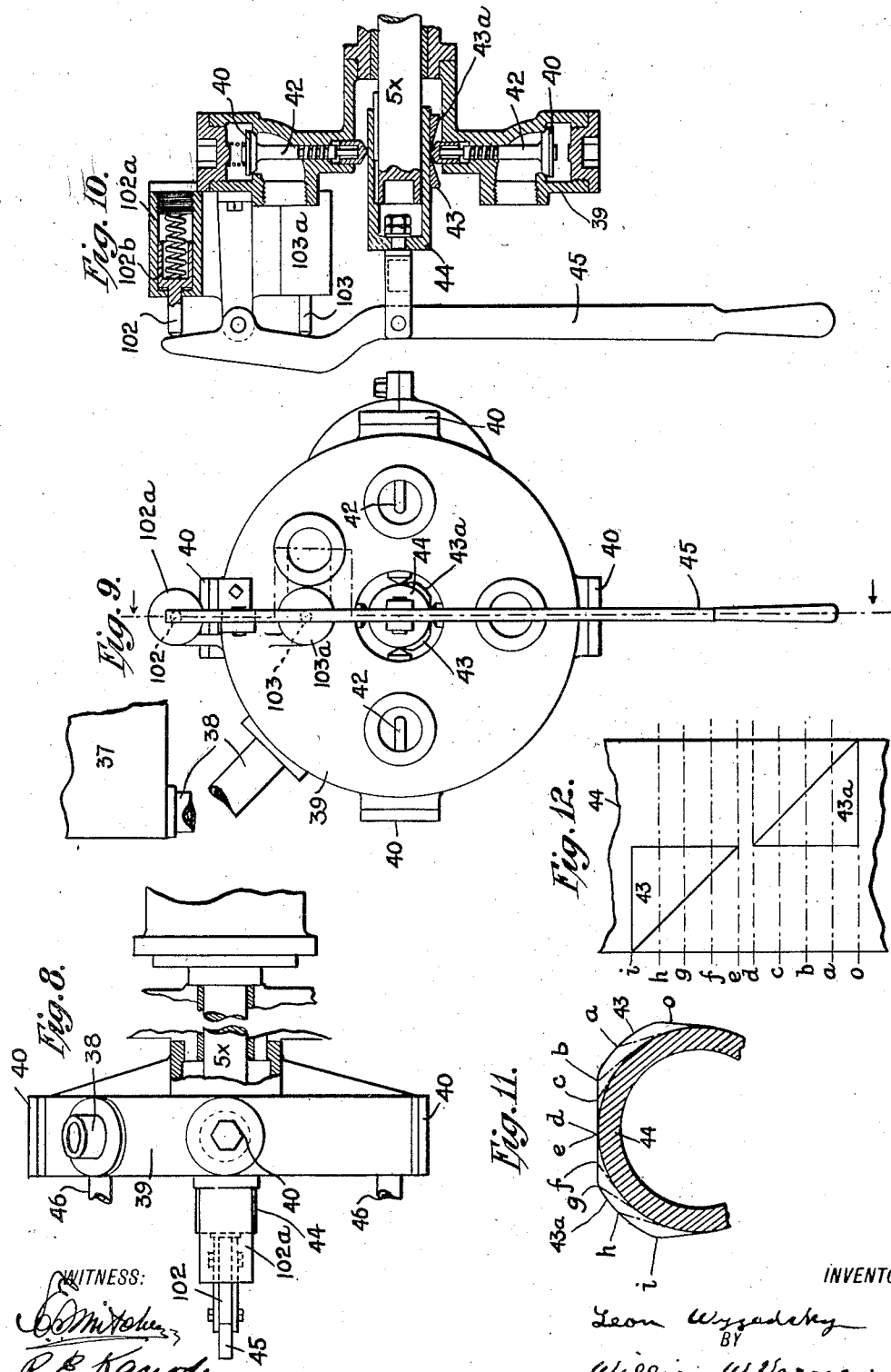

UNITED STATES PATENT OFFICE.

LEON WYGODSKY, OF BALTIMORE, MARYLAND, ASSIGNOR TO BALTIMORE OIL ENGINE COMPANY, OF BALTIMORE, MARYLAND, A CORPORATION OF DELAWARE.

COMBINED AIR PUMP AND STARTER MOTOR MECHANISM FOR INTERNAL-COMBUSTION ENGINES.

1,406,319.     Specification of Letters Patent.    Patented Feb. 14, 1922.

Original application filed August 22, 1917, Serial No. 187,662. Divided and this application filed November 23, 1918. Serial No. 263,853.

*To all whom it may concern:*

Be it known that I, LEON WYGODSKY, a citizen of the United States, and a resident of Baltimore city, in the State of Maryland, have invented a Combined Air Pump and Starter Motor Mechanism for Internal-Combustion Engines, of which the following is a specification.

My invention relates to a combined air pump and starter motor mechanism for internal combustion engines and is described herein in connection with an internal combustion engine of my invention illustrated, described, and claimed in another application for Letters Patent, Serial No. 187,662, filed August 22, 1917, of which the present application is a division. The engine described in said application, Serial No. 187,662, is, in the form illustrated and described therein, of the two-cycle type, though in many respects not necessarily limited to that type, and is composed of a multiple of cylinder structures, each such structure comprising pistons working in opposite directions relatively, and on opposite sides of a single compression space within that cylinder structure; and such engine has two crank shafts, together with suitable means for transferring power from the one crank shaft to the other. Air is supplied to the engine cylinders by so-called scavenging pumps, which not only serve for the supply of air to sweep out of the engine cylinders the products of previous combustion, but also supply air for the combustion of the next ensuing charge of fuel. These scavenging pumps also serve as an air motor for starting and reversing the engine.

My invention consists in the novel combination of such scavenging pumps and starter motor mechanism with the engine; in the novel valve arrangements for such scavenging pumps and starter motor; in the novel controlling valve means for the starter motor; and in other features as hereinafter described and particularly pointed out in the appended claims.

The objects of my invention are to improve internal combustion engines, particularly engines of the fuel-injection, self starting and reversing type; to insure high economy of operation; to provide for the thorough scavenging of the engine cylinders; to provide for the ready starting and reversing of the engine; and to make the air supply and starting mechanism simple, compact, economical, and entirely reliable.

I will now proceed to describe my invention with reference to the accompanying drawings, and will then point out the novel features in claims.

Figure 2:
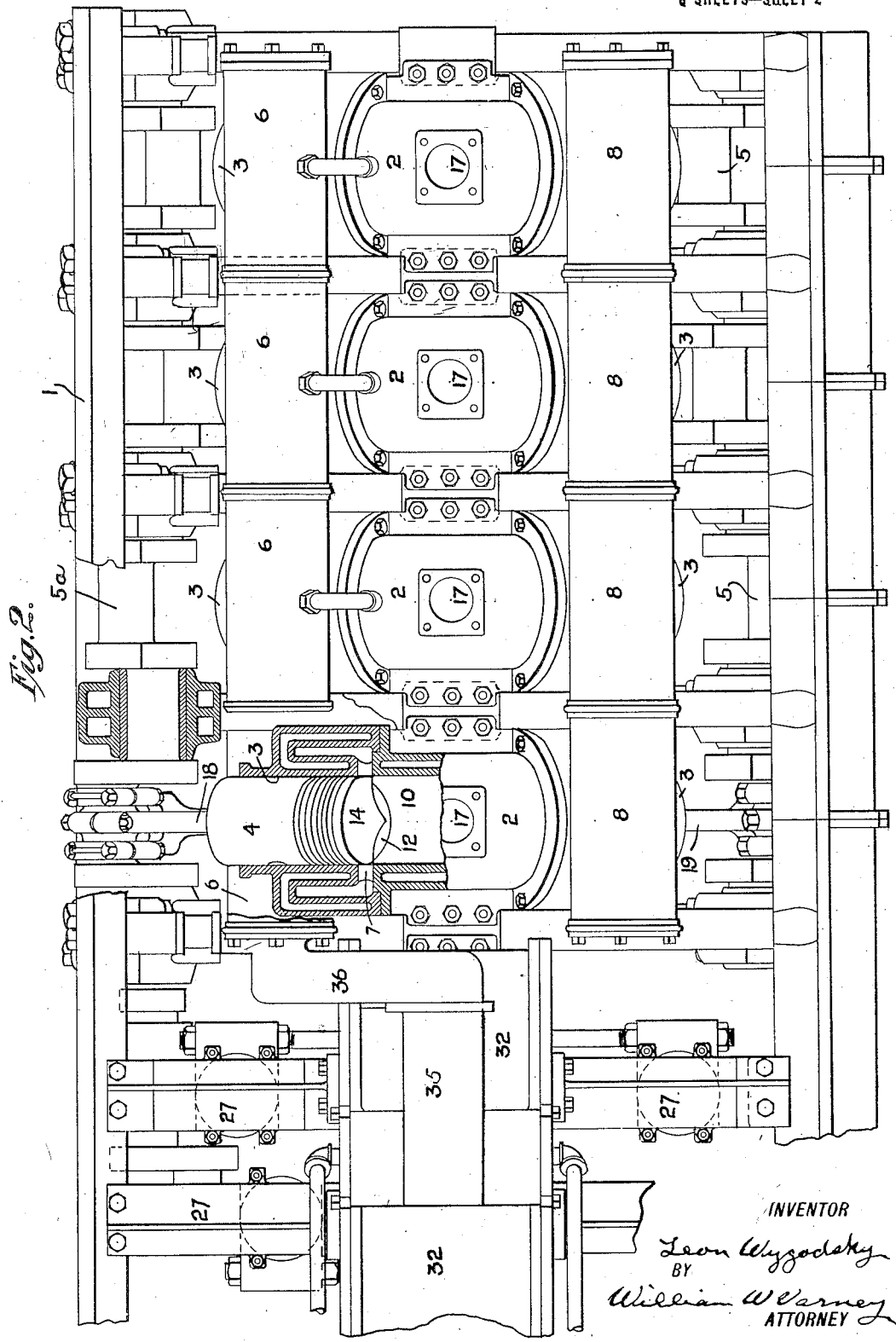
Figure 3:
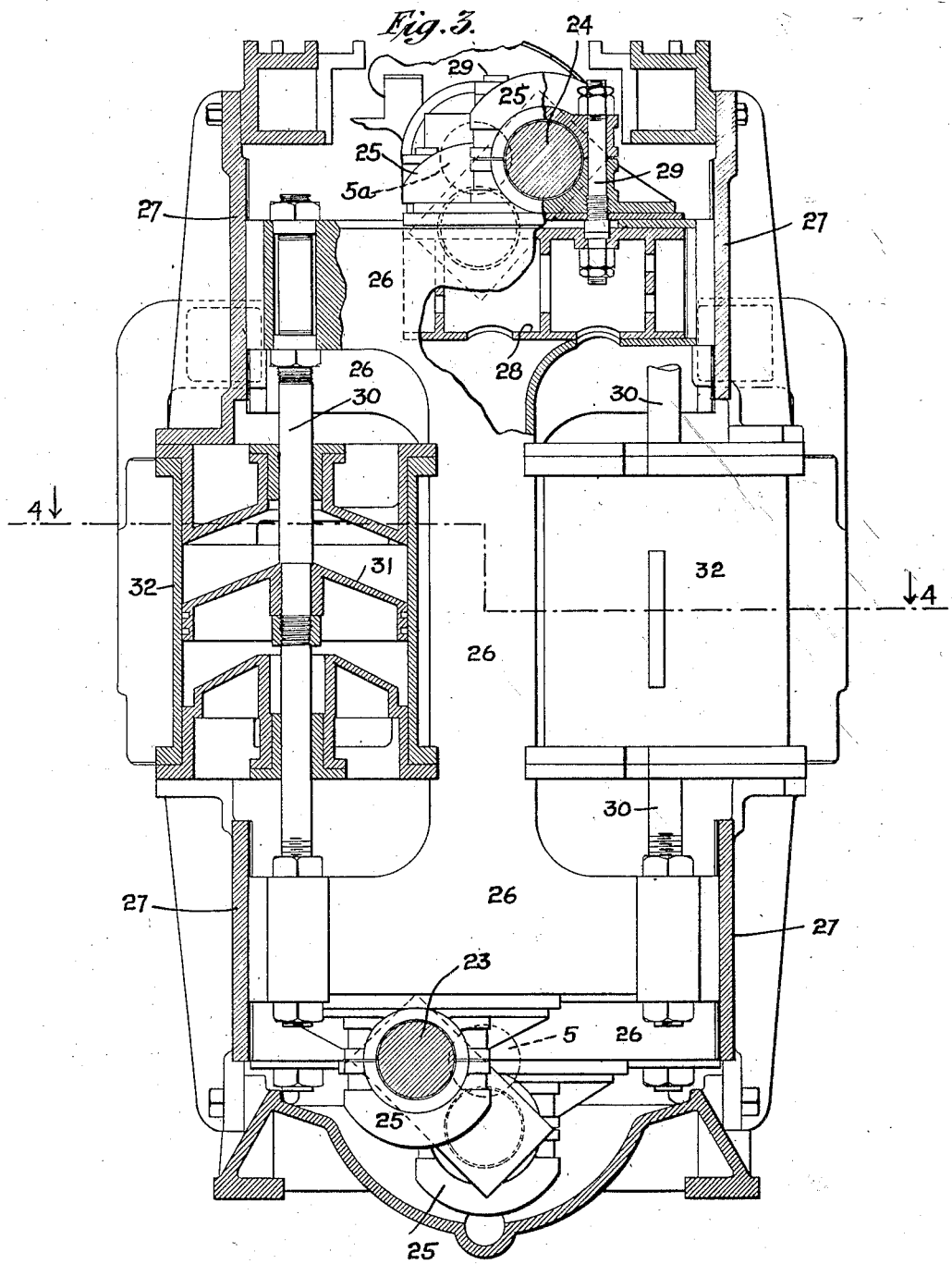
Figure 4:
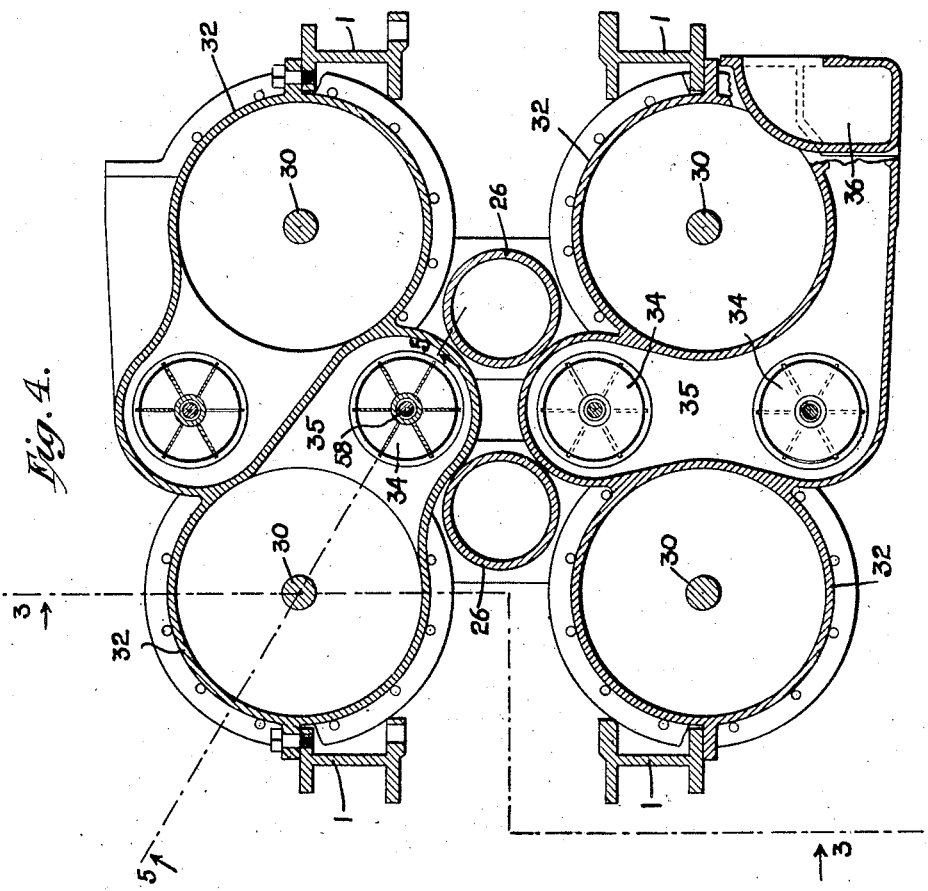

In the drawings:

Figure 1 shows a transverse vertical section of the engine, through the center of one of the cylinder structures; Figure 2 shows a partial side view and partial oblique section on the line 2—2 of Figure 1. Figure 3 shows an end elevation and partial central vertical section of the mechanism for transmitting motion from the upper to the lower crank shaft and of two of the scavenging pump cylinders, one of which cylinders is shown in central vertical section on the line 3—3 of Figure 4; Figure 4 shows a horizontal section of the scavenging pump on the irregular section line 4—4 of Figure 3. Figure 5 shows a central vertical section through one of the cylinders and valve chambers of the scavenging pump, the section being taken on the line 5—5 of Figure 4; Figure 6 is a side elevation of one of the valve cages of Figure 5, with portions of the valve bands broken away; Figure 7 is a top view and partial horizontal section of the valve structure shown in Figure 6. Figure 8 shows a top view of the controlling valve mechanism for starting and reversing; Figure 9 shows an end elevation of such controlling mechanism; Figure 10 shows an axial section of such controlling mechanism. Figure 11 is a fragmentary cross-section of the starting cam of such controlling mechanism, and Figure 12 is a development of that cam, corresponding points in the cam being designated by like characters in two views.

In the drawings: 1 designates the engine frame; 2 designates a combustion-chamber and working-cylinder structure, to which are attached guide cylinders 3. 4 designates the engine pistons, 5 designates a lower crank shaft, and 5$^a$ an upper crank shaft, power being transmitted from the one crank shaft to the other by mechanism hereinafter described. 6, 6 designate jacketed air-inlet manifolds, to which air is supplied by the scavenging pumps as hereinafter described, and from which air passes, at suitable times, to a belt of inlet ports 7, for each cylinder structure 2, uncovered by the upper piston 4 of that structure when that piston nears the outboard or upper end of its stroke. 8 designates a jacketed exhaust manifold, to which exhaust gases pass from a port belt 9, for each cylinder structure 2, which port belt is uncovered by the lower piston 4 of that structure when such piston nears the lower or outboard end of its stroke. 10 and 11 are the cylinders proper, located within the cylinder structure 2, with their axes angularly related relatively. This engine is designed to work at a compression pressure of approximately 300 pounds to the square inch, and, therefore, a small clearance space is necessary when the two pistons 4 are at the inboard limits of their stroke. The piston heads are provided with curved surfaces 14 and 15, between which surfaces, when the two pistons are at the inboard ends of the stroke, there will be a clearance space, in which air, compressed by the rearward motion of the pistons, will lie, and into which oil may be sprayed by a suitable sprayer (not shown) set into the port 17.

In order to reduce the clearance space to obtain the desired compression pressure, part of each piston is cut away, so as to provide plane oblique surfaces 12, 13 as clearly shown in Figure 1.

The port belts 7 and 9 are formed, in the guide cylinders 3, as slots separated by port-bridges, which slots are open at the inboard ends of the guide cylinders 3, so far as those cylinders are concerned, but are closed by the proximate surfaces of the cylinder structure 2. These guide cylinders 3 are bolted to the cylinder structure 2. The general structure is such as to provide a clear flow for air into, and clear flow for exhaust gases out of, the cylinders, when the ports are uncovered by the corresponding pistons. Owing to the fact that the exhaust is from the ports at the bottom of the cylinder structure 2, any liquid or solid deposits in the cylinder structure will be swept out of the exhaust ports by the exhaust gases and by air entering the admission ports. The pistons are connected to the cranks of the crank shafts 5 and 5ª by the usual connecting rods 18 and 19. As shown particularly in Figure 2, one of the connecting rods working on each crank pin is forked, the connecting rod of the laterally opposite cylinder working on that same crank pin, and having its end lying within the fork of the other connecting rod working on that crank pin. Assuming, for the moment, the supply of air under pressure from scavenging pumps, to be mentioned hereinafter, to the inlet manifolds 6, and assuming, for the present, the transmission of power by means hereinafter described, from the one crank shaft to the other, the operation of the engine is as follows:

In Figure 1, the pistons 4 of the left hand side of the engine are shown in such position that the air inlet ports and the exhaust ports are open. Air for scavenging purposes, and for the supporting of combustion during the next ensuing power stroke, is, therefore, passing from manifold 6 through the air admission ports 7, and is also sweeping exhaust gases of the previous power stroke out through the exhaust ports 9 and exhaust manifold 8. Immediately after the beginning of the inboard strokes of the pistons 4, the ports 7 and 9 are closed by said pistons, and each pair of coacting pistons then compresses the air within the cylinder structure, until, finally, the pistons reach the extreme inboard position indicated in dotted lines in Figure 1. At or about this time oil is injected through the sprayers into the compression space between the pistons, ignition taking place either due to the high temperature of the walls of this space, or by reason of the oil spray being ignited by igniters 20, hereinafter mentioned. The pistons then move apart, under the influence of the pressure due to the ignition of the charge, and when, near the outboard ends of the strokes of the pistons, ports 7 and 9 are uncovered, exhaust and air admission occur, the air sweeping the exhaust products out of the cylinder structure, as previously described. The two crank shafts revolve in opposite directions, power being transmitted from the one to the other by means hereinafter described.

Obviously, means must be provided for the transmission of motion from shaft 5ª to shaft 5 or vice versa, that the shafts may rotate in synchronism; and, obviously, such transmission means must be capable of transmitting considerable power. Without limiting myself to any particular means for this purpose, I have illustrated, particularly in Figures 2 and 3, a very suitable mechanism. The crank shafts 5 and 5ª are provided with corresponding crank pins 23 and 24, located 90 degrees apart, in the construction shown, and on these crank pins are mounted bearing blocks 25, arranged to slide horizontally and transversely on bearing surfaces formed on I-shaped members 26, themselves mounted to reciprocate vertically between stationary guides 27 provided on the engine frame. These members 26 are hollow, and, so far as may be, of circular cross-section, and within their upper and lower horizontal arms are guide-sleeves 28, connected to the sliding bearing-blocks 25 by bolts 29 themselves working in suitable slots in members 26. By means of these sleeves 28 and bolts 29, the bearing-blocks 25 are held to their respective guide-surfaces of the members 26.

In a general way, the structure comprising the vertically-sliding I-shaped members 26 upon which the crank-pin bearing blocks 25 slide, forms the equivalent of "parallel rods" connecting the two crank shafts 5 and $5^a$; with this exception, however, that in the construction shown the direction of rotation of the two crank shafts need not be the same, but may be opposite; and as a matter of fact, in the structure shown the parts are arranged for rotation of the two crank shafts 5 and $5^a$ in opposite directions; this being the case in order that the same crank pins of the main engine may serve for connecting rods of laterally opposite cylinders, and in order that the main engine may be reversible.

For the supply of scavenging air to the engine cylinders, and also for the starting and reversing of the engine, air cylinders 32 are provided; and compactness and efficiency are promoted by operating the pistons of these air cylinders by means of the I-shaped members 26, previously mentioned; the upper and lower horizontal arms of said members being connected by piston rods 30, carrying pistons 31 working in stationary cylinders 32 secured to convenient portions of the engine frame. Each of these pump cylinders 32 is "double acting," having upper and lower admission valves 33 (Figure 5), of a type hereinafter described, whereby, during each suction stroke, air is admitted to the appropriate side of the pump cylinder; and having also upper and lower discharge valves 34, whereby, at a suitable point in each compression stroke, the air compressed is released into a receiver space 35, whence the compressed air is conducted, by a pipe 36, forming a continuation of the receiver space, to the air inlet manifolds 6. There being four double-acting pump cylinders, each of large capacity, operating at the speed of the main engine, the supply of air for scavenging and for cylinder charging is ample.

As indicated in the lower part of Figure 4, the receiver space of each inner valve chamber communicates with the receiver space of the corresponding outer valve chamber, and so to the air inlet manifold.

The engine is provided with a suitable fuel supply pump supplying fuel at high pressure to the sprayers, as hereinafter described. The engine will also be provided with some means for compressing air to high pressure for starting purposes, or an auxiliary air pump may be provided for that purpose; but these are usual auxiliaries of engines of this type, and I have not thought it necessary to illustrate such auxiliaries herein. As previously mentioned, the scavenging pumps are used as an air motor for starting and reversing the main engines. For this purpose a control valve mechanism is employed, which is illustrated particularly in Figures 8, 9, and 10, and which interacts with the admission valves 33 of the scavenging pumps in a manner to be described presently.

As I have shown in Figure 9, there is an air storage reservoir 37, in which air under high pressure is maintained for starting and reversing. This reservoir communicates, through a valved pipe 38, with an air belt 39, in which there are a number of discharge valves 40, (four in the construction shown). The valves 40 in the construction shown are ordinary lift poppet valves and their stems 42 are arranged to be operated by one or the other of two opposed cams 43 and $43^a$ (Figures 9 and 11) on a shaft 44 in axial line with, and arranged to be driven by, one of the crank shafts 5—$5^a$ of the main engine and scavenging pump, through the shaft $5^x$ of the fuel pump. In the construction shown, shaft 44 is hollow and is arranged to slide back and forth over such shaft $5^x$, a key on shaft $5^x$ working in a corresponding key-way of the shaft 44, serving to communicate rotation from shaft $5^x$ to shaft 44.

In the normal position of shaft 44, neither cam 43 nor cam $43^a$ is in operative position. A handle 45 is provided whereby the shaft 44 may be moved longitudinally in either direction to drive the one cam or the other into action. Cam 43 may be considered to be the "ahead" cam, and cam $43^a$ the "astern" cam. Suitable pipes 46 connect the discharge spaces beneath the valves 40 with the inlet valves of the pump cylinders; and the angular relation of shaft 44 being always the same with respect to shaft $5^a$, and the position of the cams 43 and $43^a$ being therefore always the same with respect to the pistons of the scavenging pump, it matters not in what position the engine may have stopped; the pistons of two of the four scavenging pumps will always be in such position that air admitted to the proper side of those two pistons will start the engine in ahead rotation. (A similar statement is true with respect to starting in reverse rotation).

It will be noted that it is necessary to move the cam 43 (or $43^a$, as the case may be) only far enough to merely lift one of the valves 40. It is not necessary to move the cam to such extent as to cause the corresponding pump cylinders to take air under pressure to the full limit of the stroke or to the maximum limit determined by the maximum breadth of the cam. In this respect this cam mechanism for operating the valve 40 constitutes a "variable cut-off admission mechanism" whereby air is admitted to the pump cylinders only to such extent as is required for the starting of the engine. In this way consumption of "starting air" is very greatly reduced, as compared with ordinary practice in the starting of large engines by means of compressed air. Also, in general, it will be necessary to admit compressed air for a brief instant only; the construction of the main engine being such, particularly with respect to its large number of working cylinders, that as soon as the engine has started to turn over combustion will occur in one or more of the cylinder structures followed almost immediately by combustion in other of the cylinder structures. In a word, the air starter of this engine is required merely to give a "kick" to the main engine, which then starts up of itself. This in turn tends to reduce very greatly the consumption of starting air.

Starting in the reverse direction is precisely the same as starting in the ahead direction.

Relief valves 47 are provided on the heads of the pump cylinders to prevent production of excessive pressures in those cylinders at any time, as for example when starting air is admitted to one side of a pump piston, when there is already considerable air pressure on the opposite side of that pump piston; however, as explained later, these relief valves are, in general, an unnecessary precaution, since the control of the starting lever by its dashpots, hereinafter mentioned, is such as to prevent undue accumulation of air pressure in the pump cylinders.

Referring again to Figure 5, and to Figures 6 and 7: Each admission valve 33 of each pump cylinder comprises a cage 48 with circumferential ports 49 normally closed by circular spring valves 50 hereinafter referred to. The cage also comprises a central hollow stem 51 provided with a connection 52 for the appropriate air supply pipe 46 from the control valve structure of Figures 8, 9, and 10. This valve cage is closed at its lower end. Within the bore of the stem 51 is a valve piston 53 having at its end a valve disk 54. The valve piston 53 has in its side ports 53$^a$ also another port or ports 53$^b$ extending to an annular space 53$^c$ between valve disk 54 and the head of the valve cage. It will be obvious that upon admission of air under pressure at 52 the valve disk 54 and valve stem 53 will be forced out, driving the valve disk 54 against a seat of the corresponding discharge valve, as hereinafter mentioned, and permitting air under pressure to pass through ports 53$^a$ into the pump cylinder, so actuating the piston of that cylinder.

The discharge valves 34 are of similar construction to the admission valves 33, except that their valve cages 57 are provided each with a seat to coact with the valve disk 54 of the corresponding admission valve.

When, in starting, compressed air is admitted and caused to act upon one of the piston valves 53, it opens that valve against the pressure of the spring 56, and communicates motion to that valve with sufficient velocity so as to carry the valve across and cause the corresponding valve disk 54 to seat on the cage of the discharge valve. The superior air pressure upon the outer face of such valve disk 54 holds that valve disk seated until, when the corresponding side of the pump cylinder should be open to exhaust, that valve 53—54 is raised off its seat on valve cage 57 by mechanism now to be described.

At the time of the opening of one of the air admission valves 53, and simultaneous closing of the corresponding discharge valve, it is important that the discharge valve for the other side of the pump cylinder be opened, because, as in an ordinary steam engine, exhaust must begin at one side of the piston when admission begins on the other side thereof. To this end I have provided a valve-operated stem 58 mounted in a central bearing of the cages of the two discharge valves. This stem is located between the two valve disks 54. When one of these valve disks 54 is moved toward the center by air pressure behind it, it forces the stem 58 against the other valve disk 54 and so lifts that other valve disk 54 from its seat on the cage of the corresponding discharge valve.

The area of valve disk 54 exposed to starting air pressure is always greater than the area of that disk 54 exposed to pressure of the pump cylinder. Therefore, it follows that under all conditions of starting, upon the admission of starting air there will be an excess of pressure tending to move that valve disk 54 to which the starting air pressure is so applied, and, correspondingly, to start from its seat on the corresponding discharge valve cage, the other valve disk 54. Once valve disk 54 has been started from its seat on this valve cage, it will continue to move, opening the corresponding side of the pump cylinder to discharge.

Springs 56 are provided for the several valve disks 54.

The admission and discharge valves 33 and 34 comprising the circumferentially ported cages 48 and 57 and the band spring valves 49 have the advantages of extreme simplicity and compactness of structure, as well as extremely large area of port opening, and are suitable, not only for use in the present engine, but also for use in air compressors, particularly of the "blowing engine" type, and in water pumps and various other types of engines. Each such valve cage is provided with a number of peripheral slots 49 over which is located a band 50 of spring steel or other thin, highly resilient material, ground on the inside to fit closely the seat surrounding the corresponding groove 49; the slots 49 being ports leading from these seats in the interior of the valve cage. The bands 50 are split bands; that is to say they have free ends lying beneath the heads of screws 60, which heads hold the bands in place, both preventing the ends of the bands from flying out, and preventing rotation of the bands. Headed projections 61, located at suitable intervals, also help to hold the bands 50 in place.

When, because of suction created in one of the pump cylinders (in the case of an admission valve) or when the pressure in the pump cylinder becomes materially greater than that in the receiver space (in the case of a discharge valve), the pressure on the inner side of one of these bands becomes greater than the pressure on the opposite side, that band opens up like a hoop, permitting passage of air; and upon creation of reverse condition of pressure the bands contract, seating against their ports. Since the inside faces of these bands are ground or otherwise finished to a true surface, the seating is very tight.

Valves so constructed will work with a very small pressure differential, offer very little resistance, require no mechanical parts for their operation, require no lubrication, and are very easily constructed. The lever 45, by which the cams 43 and 43ª are shifted, is normally held in neutral position by two spring-actuated plungers 102 and 103, which oppose each other through said lever 45. Of course, the lever can be moved in either direction, by hand, thereby operating the corresponding cams 43 or 43ª; but as soon as the hand actuating such lever releases the same, it returns to normal position, under the influence of one or the other of the two plungers mentioned. Such return is retarded by the dash-pots 102ª and 103ª, and by the pistons of said dash-pots, of which one, 102ᵇ, is shown.

It has been stated above that the relief valves 47 are really merely an extra precaution; the control of the starting lever 45 by the dash-pots being such as to prevent undue accumulation of air under pressure in the pump cylinders. This action is as follows:

In starting the engine in either direction (see Figure 5) suppose air has been admitted, for example, below one of the pistons of the air pump, and the lower valve disk 54 of the corresponding cylinder has been caused to close the corresponding discharge valve 34; the piston continues to advance for some distance before the supply of air is cut off, and if no more air is admitted into the space above the piston, there is nothing to cause unseating of the said lower valve 54, and during the next down stroke of the piston the air below the piston might be compressed to a much higher pressure than that of starting air, except for the action about to be described or except for the relief valves, set to open at a pressure 10 or 15 lbs. above the starting air pressure; independent of these relief valves, however, the dash-pots of the lever 45 cause that lever to return somewhat slowly so that the starting air will act alternately on both the upper and the lower valve disks 54, without bringing said disks to the extreme position, which would mean the closing up of the discharge passages. Naturally, when the lever 45 at last comes to a neutral position, the air is shut off altogether, and the disks 54 are kept in their normal positions by their corresponding springs.

The starting air exhausted through valve 57 is directed into space 35 and thence by means of connector 36 which is attached to the air manifold 6, conducts said exhaust air into the working cylinder. This action scavenges and supplies the working cylinders with pure air and makes the starting more sure.

For insuring ignition when starting, I prefer to use a hot wire igniter, preferably that shown in Patent No. 1,237,851, dated August 21, 1917.

In another application for Letters Patent, Ser. No. 187,522, filed August 22, 1917, I have claimed the valve comprising the flexible spring band, per se. In the present application I claim said valve only in connection with such features as are required for the supply and exhaust of the working fluid of the starting motor.

What I claim is:

1. An internal combustion engine comprising a plurality of working cylinders, and pistons therefor, and a plurality of connected means to which such pistons impart rotation, and scavenging pumps driven by such means to which rotation is so imparted, said pumps comprising also variable cut off motor valve mechanism whereby said pumps may be used as motors to start the engine.

2. An internal combustion engine comprising a plurality of working cylinders, and pistons therefor, and a plurality of connected means to which such pistons impart rotation, and scavenging pumps driven by such means to which rotation is so imparted, said pumps comprising also variable cut off and reversing motor valve mechanism whereby said pumps may be used as motors to start and reverse the engine.

3. An internal combustion engine comprising in combination two crank shafts, power cylinders and pistons therefor and means connecting said pistons to said crank shafts to cause rotation of the latter, means for causing said crank shafts to rotate synchronously, combined pump and starter-motor cylinders having pistons likewise connected to said crank shafts to be driven by, or to drive, the latter, said pump cylinders having admission and discharge valves in pairs and also an additional valve for each such pair which, upon the admission of high pressure air for starting, closes the corresponding discharge valve.

4. An internal combustion engine comprising in combination two crank shafts, power cylinders and pistons therefor and means connecting said pistons to said crank shafts to cause rotation of the latter, means for causing said crank shafts to rotate synchronously, combined pump and starter-motor cylinders having pistons likewise connected to said crank shafts to be driven by, or to drive, the latter, said pump cylinders having admission and discharge valves in pairs and also an additional valve for each such pair which, upon the admission of high pressure air for starting, closes the corresponding discharge valve, and distributing valve means arranged to admit high pressure air to the admission valves of said pump cylinders in sequence for starting.

5. An internal combustion engine comprising in combination two crank shafts, power cylinders and pistons therefor and means connecting said pistons to said crank shafts to cause rotation of the latter, means for causing said crank shafts to rotate synchronously, combined pump and starter-motor cylinders, having pistons likewise connected to said crank shafts to be driven by, or to drive, the latter, said pump cylinders having admission and discharge valves in pairs and also an additional valve for each such pair which, upon the admission of high pressure air for starting, closes the corresponding discharge valve, and distributing valve means arranged to admit high pressure air to the admission valves of said pump cylinders in sequence for starting, the said additional valves of said pump cylinders being arranged to be operated, by the high pressure air so admitted, to close the corresponding discharge valves.

6. An internal combustion engine comprising in combination two crank shafts, power cylinders and pistons therefor and means connecting said pistons to said crank shafts to cause rotation of the latter, means for causing said crank shafts to rotate synchronously, combined pump and starter-motor cylinders having pistons likewise connected to said crank shafts to be driven by, or to drive, the latter, said pump cylinders having admission and discharge valves in pairs and also an additional valve which opens for admission of high pressure air for starting and in so doing closes the corresponding discharge valve, and which opens said discharge valve for exhaust and in so doing closes the high pressure air admission conduit.

7. An internal combustion engine comprising in combination two crank shafts, power cylinders and pistons therefor and means connecting said pistons to said crank shafts to cause rotation of the latter, means for causing said crank shafts to rotate synchronously, combined pump and starter-motor cylinders having pistons likewise connected to said crank shafts to be driven by, or to drive, the latter, said pump cylinders having admission and discharge valves in pairs and also an additional valve which opens for admission of high pressure air for starting and in so doing closes the corresponding discharge valve, and which opens said discharge valve for exhaust and in so doing closes the high pressure air admission conduit, and means for causing said additional valves to open the discharge valves for exhaust, and to close the high pressure air admission conduit.

8. The combination, with a crank shaft, and combined pump and starter-motor cylinders having pistons connected to said crank shaft to drive, or be driven, thereby, of companion admission and discharge valves for each cylinder, and an additional valve for each such pair of admission and discharge valves, a conduit for admission of high pressure air, such additional valve normally closing such conduit, and means for causing said additional valve to open said conduit and in so doing to close the corresponding discharge valve.

9. The combination, with a crank shaft, and combined pump and starter-motor cylinders having pistons connected to said crank shaft to drive, or be driven, thereby, of companion admission and discharge valves for each cylinder, and an additional valve for each such pair of admission and discharge valves, a conduit for admission of high pressure air, such additional valve normally closing such conduit, means for causing said additional valve to open said conduit and in so doing to close the corresponding discharge valve, and means for causing said additional valve to open said discharge valve for exhaust, and to return to normal position.

10. The combination, with a crank shaft, and combined pump and starter-motor cylinders having pistons connected to said crank shaft to drive, or be driven, thereby, of companion admission and discharge valves for each cylinder and an additional valve, for each such pair of admission and exhaust valves, the discharge valve having a seat for such additional valve, whereby said discharge valve is closed when the additional valve is on said seat, means for moving such additional valve to its seat upon admission of high-pressure air for starting, and means for returning said additional valve to first position.

11. The combination, with a crank shaft, and combined pump and starter-motor cylinders having pistons connected to said crank shaft to drive, or be driven, thereby, of companion admission and discharge valves and an additional valve arranged to play therebetween, the discharge valve having a seat for such additional valve, whereby such discharge valve is closed when the additional valve is on said seat, a high pressure air admission conduit, a piston for operating the additional valve located therein, and means tending to hold said additional valve away from its seat.

12. The combination, with a crank shaft, and combined pump and starter-motor cylinders having pistons connected to said crank shaft to drive, or be driven, thereby, of companion admission and discharge valves and an additional valve arranged to play therebetween, the discharge valve having a seat for such additional valve, whereby such discharge valve is closed when the additional valve is on said seat, a high pressure air admission conduit, a piston for operating the additional valve located therein, means tending to hold said additional valve away from its seat, and means for tripping said additional valve from its seat to start it in return motion.

13. The combination, with a crank shaft, and combined pump and starter-motor cylinders having pistons connected to said crank shaft to drive, or be driven, thereby, of companion admission and discharge valves and an additional valve arranged to play therebetween, the discharge valve having a seat for such additional valve, whereby such discharge valve is closed when the additional valve is on said seat, a high pressure air admission conduit, means operated upon admission of high pressure air for moving said additional valve to its seat on the discharge valve, and means operated by one such additional valve, when so moved, for unseating from its discharge valve seat another and corresponding additional valve, together with means for returning to normal position the additional valve so unseated.

14. The combination, with a combined pump and starter-motor cylinder, of valves therefor comprising admission and discharge valves each consisting of a hollow valve cage and valve means thereon arranged to open for admission or discharge respectively, the admission valve cage being provided with a central passage forming a high pressure air admission conduit, the discharge valve cage having a seat whereby discharge through that valve cage may be prevented by seating of a valve thereon, and an additional valve having a guide and actuating piston within the said high pressure air admission conduit, said additional valve arranged to seat against the said valve seat of the discharge valve cage, and means tending to hold said additional valve away from such seat.

15. In an internal combustion engine, the combination with main working cylinders and pistons and a crank shaft to which said pistons are connected, pump cylinders and pistons therefor driven by said crank shaft, and valve means whereby said pump cylinders and pistons may be operated as a motor, and a controlling valve gear for said motor comprising an annular supply-belt provided with working-fluid admission means, and with valves each connected to a corresponding motor-valve means of the motor, a shaft centrally located with respect to said supply-belt and driven by the crank shaft, and a cam on said shaft arranged to open the valves of said supply belt in sequence.

16. In an internal combustion engine, the combination with main working cylinders and pistons and a crank shaft to which said pistons are connected, pump cylinders and pistons therefor driven by said crank shaft, motor-valve means whereby said pump cylinders and pistons may be operated as a motor, and a controlling valve gear for said motor comprising an annular supply-belt provided with working-fluid admission means, and with valves each connected to a corresponding motor-valve means of the motor, a shaft centrally located with respect to said supply belt and driven by the crank shaft, and two cams on said shaft, and means for shifting said cams into and out of operative position with respect to the valves of said supply belt, one of said cams arranged for starting in ahead rotation, the other for starting in astern rotation.

17. In an internal combustion engine, the combination with main working cylinders and pistons and a crank shaft to which said pistons are connected, pump cylinders and pistons therefor driven by said crank shaft, and valve means whereby said pump cylinders and pistons may be operated as a motor, controlling valves for said motor and means for operating the same in sequence comprising an operating member which, in normal position, prevents operation of said controlling valves and in another position causes operation of said controlling valves, and means causing retarded return of said operating member to normal position, whereby by progressively decreasing opening of the controlling valves and correspondingly decreasing operation of the motor valve means accumulation of undue pressure in the pump cylinders is prevented.

18. In an internal combustion engine, the combination with main working cylinders and pistons and a crank shaft to which said pistons are connected, pump cylinders and pistons therefor driven by said crank shaft, and motor-valve means for said pump cylinders comprising admission and exhaust valves and additional valves arranged, upon the admission of working fluid, to close such exhaust valves and hold same closed until about the end of the corresponding working stroke and then to operate to permit passage of exhaust fluid to said exhaust valves, controlling valves adapted for controlling the supply of working fluid to said motor-valve means, and operating means for said controlling valves comprising an operating member which, in normal position, prevents operation of said controlling valves, and in another position causes operation of said controlling valves, and means causing retarded return of said operating member to normal position, whereby by progressively decreasing opening of the controlling valves and correspondingly decreasing operation of the said additional valves, accumulation of undue pressure in the pump cylinders is prevented.

19. An internal combustion engine comprising, in combination with main working cylinders and pistons and a crank shaft to which said pistons are connected, pump cylinders and pistons therefor driven by said crank shaft, and motor-valve means for said pump cylinders comprising admission and exhaust valves, also additional valves arranged, upon the admission of working fluid, to close such exhaust valves and hold same closed until about the end of the corresponding working stroke, means operated by each such additional valve whereby as such additional valve moves to close its corresponding exhaust valve another additional valve is moved from its seat on its exhaust valve and caused to return to normal position, and means for controlling the supply of working fluid to said admission valves.

20. An internal combustion engine comprising, in combination with main working cylinders and pistons and a crank shaft to which said pistons are connected, pump cylinders and pistons therefor driven by said crank shaft, and motor-valve means for said pump cylinders comprising admission and exhaust valves, also additional valves arranged, upon the admission of working fluid, to close such exhaust valves and hold same closed until about the end of the corresponding working stroke, a valve shifting rod located between two such additional valves and arranged to be operated by either such valve to move the other away from its exhaust-valve seat, and means for controlling the supply of working fluid to such admission valves.

21. An air pump provided with inlet and exhaust means, means of converting said air pump into a prime mover by automatically controlling the exhaust thereof through means responsive to the operating fluid to control the said exhaust and means for admission of the working fluid into said prime mover.

22. An internal combustion engine provided with an air supply, in combination with an air pump-starter providing said air and simultaneously operating to mechanically start said engine, and means of discharging the exhaust from said starter into the induction manifold of the power cylinder and means for admission of the working fluid into said prime mover.

23. An internal combustion engine provided with an air supply means, in combination with an air pump-starter providing said air and simultaneously operating to mechanically start said engine, said air pump being provided with inlet and exhaust means, means of converting said air pump into a prime mover by automatically controlling the exhaust thereof through means responsive to the operating fluid to control the said exhaust, and means for admission of the working fluid into said prime mover.

24. An air pump in combination with an internal combustion engine providing scavenging air for said engine; the same pump operating as a starting motor by admitting compressed air into said pump using the exhaust air from said pump for scavenging the working cylinders.

25. In a multi cylinder prime mover, a pneumatic control of the admission and of the exhaust of the working fluid, comprising a member provided with a cam operating all the valves which actuate admission and exhaust of the operating fluid of said prime mover, said valves being in timed relation with the prime mover and so situated as to be operated by a single cam, and means for throwing said cam in and out of operation.

26. In a multi cylinder prime mover, a pneumatic control of the admission and of the exhaust of the working fluid comprising a member provided with two cams either of which can operate all the valves which actuate the admission and exhaust of the operating fluid of said prime mover, turning said prime mover in either direction respectively, said valves being in timed relation with said prime mover and are situated so as to be operated by either cam respectively, and means for throwing either cam in or out of operation progressively to effect a variable admission of the working fluid.

LEON WYGODSKY.

Witnesses:
J. LE ROY HOPKINS,
EDITH VARNEY.